United States Patent [19]

Feger et al.

[11] Patent Number: 4,835,666

[45] Date of Patent: May 30, 1989

[54] SIGNAL LAMP, ESPECIALLY FOR MOTOR VEHICLES

[75] Inventors: Rolf Feger, Bietigheim-Bissingen; Gunther Holzmacher, Asperg; Hans-Joachim Wirth, Oberstenfeld, all of Fed. Rep. of Germany

[73] Assignee: SWF Auto-Electric GmbH, Bietigheim-Bissingen, Fed. Rep. of Germany

[21] Appl. No.: 112,309

[22] Filed: Oct. 22, 1987

[30] Foreign Application Priority Data

Oct. 25, 1986 [DE] Fed. Rep. of Germany ....... 3636383

[51] Int. Cl.$^4$ ............................................. F21V 9/00
[52] U.S. Cl. .................................. 362/268; 362/231; 362/293
[58] Field of Search .................. 362/61, 80, 231, 268, 362/293, 290

[56] References Cited

U.S. PATENT DOCUMENTS

| | | | |
|---|---|---|---|
| 3,487,206 | 12/1969 | Dawson et al. | 362/80 |
| 4,042,818 | 8/1977 | Green | 362/293 X |
| 4,241,388 | 12/1986 | Green | 362/293 X |
| 4,383,290 | 5/1983 | Binder et al. | 362/293 X |
| 4,525,772 | 6/1985 | Peck | 362/290 |
| 4,530,041 | 7/1985 | Yamai et al. | 362/231 X |
| 4,558,401 | 12/1985 | Tysoe | 362/293 X |
| 4,656,567 | 4/1987 | Morris | 362/293 X |

FOREIGN PATENT DOCUMENTS

| | | | |
|---|---|---|---|
| 74727 | 3/1983 | European Pat. Off. | 362/293 |
| 3420175 | 12/1985 | Fed. Rep. of Germany | 362/293 |

Primary Examiner—Ira S. Lazarus
Assistant Examiner—Peggy A. Neils
Attorney, Agent, or Firm—James B. Raden

[57] ABSTRACT

A signal lamp for an automotive vehicle is disclosed including a housing having at least two individual signal compartments each including a light source and a common glass cover having a predetermined color. A colorless carrier disc having black opaque stripes on one side of the carrier disc and lens elements on an opposite side spans both compartments. A red color filter spans one compartment between the carrier disc and the one compartment lamp and an unsaturated light filter of a color different from the color of the glass cover spans the other compartment between the carrier disc and the other lamp. In the off condition of both lamps, the signal lamp color is determined by the color of the glass cover. The red filter produces a red signal when the one lamp is on. The combination of the unsaturated filter and the color of the glass cover produce a signal color at the second compartment when its lamp is on which is different from that of the unsaturated filter color or glass cover color and representative of a desired vehicle condition including vehicle reverse illumination, warning signal and turn signal.

11 Claims, 1 Drawing Sheet

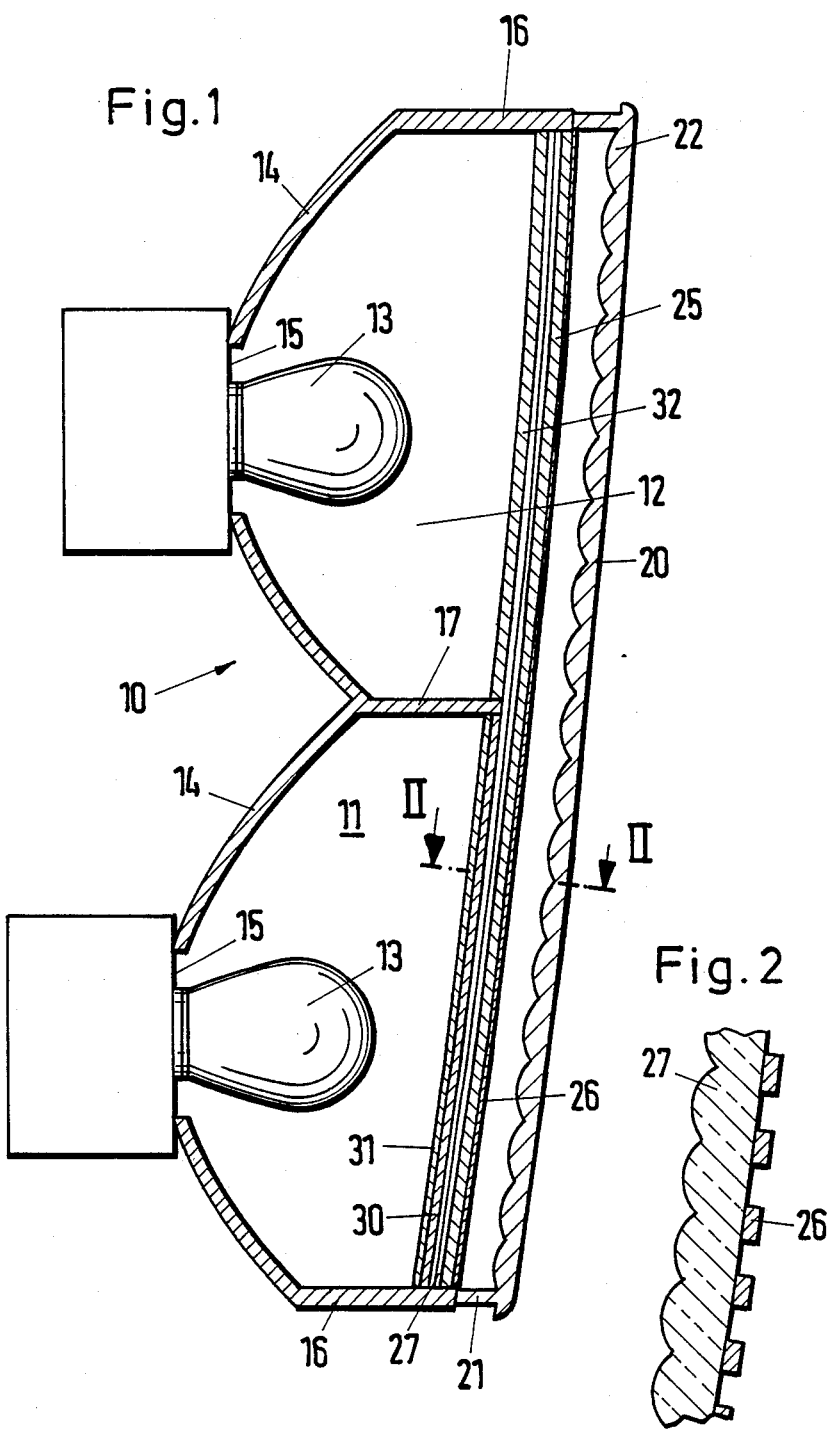

SIGNAL LAMP, ESPECIALLY FOR MOTOR VEHICLES

BACKGROUND OF THE INVENTION

The present invention relates to a signal lamp of the type used with motor vehicles. More particularly, the invention relates to a signal lamp which when switched off presents a uniform external appearance of the lamp while being capable of presenting different signal colors in operation.

Such a signal lamp is disclosed in the German specification DE-OS No. 33 26 199. This specification discloses a signal lamp for motor vehicles including a pink cover glass and another colorful filter in its interior, whereby a red, yellow or even white signal light can be produced depending on the chosen color of the filter. In order to give the cover glass, despite its own pink color, a strong red color that is not, or at most minimally, influenced by the color of the internal filter while the light source of the signal lamp is switched off, red-colored stripes are provided in the lamp between the internal filter and the outside. Heretofore, the various arrangements of the stripes has presented certain disadvantages. For example, either only a small amount of light produced by the light source is available or the entire surface of the cover glass is not available for signalling. Furthermore, some arrangements of these strips are not particularly suited to reduce the influence of the internal filter on the color of the color glass while the signal lamp is switched off. The influence of the present red-colored stripes on the color of the signal light cannot be totally avoided despite great technical efforts.

SUMMARY OF THE INVENTION

The object of this invention is to provide a signal lamp whose color while switched off is determined primarily only by the color of the cover glass and whose signal color when switched on can be easily maintained.

According to the invention, this object is achieved by a signal lamp which includes a transparent, colorless carrier disc positioned between the cover glass and a filter and having dark, opaque sections and a collecting lens which directs the light between the opaque sections.

Advantageously, the signal color of the lamp cannot be influenced by the dark stripes. Since the dark sections are placed on a separate disc and are located a predetermined distance from the internal filter they effectively can cover a larger surface of the filter than their own surface actually is. On the other hand, the entire light from the light source, which is parallelly directed by usual means, can be refracted between the opaque sections of the carrier disc by the collecting lens. In refracting the light beams by the collecting lens the whole surface of the cover glass is accordingly illuminated.

According to one advantageous embodiment of the invention, opaque, dark sections of the signal lamp are vertically arranged relative to the installed position of the device.

According to an important feature of the invention, the filter extends to the side walls of the housing near the front faces of the side walls opposite the cover glass. Advantageously, the color of the signal lamp seen is to a large extent independent of the direction from which the signal lamp is viewed. The side walls of the housing of the signal lamp are always covered by the second filter.

According to a further advantageous feature, the side walls between the cover glass and the internal filter are darkened by making them preferably black so as to minimize any influence on the signal.

According to a still further important aspect of the invention, for the purpose of giving different signals, such as turn-signals, stoplight signals, taillight signals, and reverse illumination, there is provided a housing divided into different compartments. According to one aspect of the invention, a carrier disc continuously spans across at least two neighboring compartments. Advantageously, the number of individual parts that have to be connected with each other, is reduced. The partitions between the different compartments of the signal lamp that are placed behind the carrier disc are covered by the carrier disc, and a continuous cover glass having a uniform surface is seen from the outside.

Presently, the different colored parts of the signal lamp for motor vehicles are exclusively made of plastics. With respect to the influence of the environment and for proper operation of the signal lamp, certain materials have been tested and designated for use by various countries. If a particular signal color desired is different from that of the color of the unit's cover an additional signal filter must be provided in the interior of the lamp housing. The particular color of this additional filter must be mixed in general. For example, a colorless signal light for taillights can be achieved by using a pink cover glass and another, green-blue filter. A second filter of a green-orange color with a pink cover glass results in a yellow signal light. The difficulty, however, is that transparent plastic materials of such mixed colors have not yet been approved for use in at least some countries or by some manufacturers of motor vehicles.

The invention provides for a third light filter which is a different unsaturated color than the cover glass and the second filter. Advantageously, colored plastic materials that are allowed for use can be employed for the second and the third light filter. The mixed color of the light reaching the cover glass can be produced by connecting the second and third filters in series. According to an important feature of the invention, the second and the third filter are arranged immediately one after the other with preferably one filter being immediately molded onto the other.

The use of two filters in the interior of the lamp housing has a further advantage in that the filter of the color that influences the color of the cover glass less than the other color while the signal lamp is switched off can be put in front of the other filter.

BRIEF DESCRIPTION OF THE DRAWING

A preferred embodiment of a signal lamp according to the invention is illustrated in the drawing in which:

FIG. 1 is a longitudinal section of a signal lamp with two compartments showing details on construction; and FIG. 2 is a cross section taken along the line II—II of FIG. 1 showing further details of construction.

DETAILED DESCRIPTION OF A PREFERRED EMBODIMENT

A housing 10 of a signal lamp according to the invention is shown in FIG. 1 and includes two compartments 11 and 12 having backs made of a paraboloid reflector 14 which each parallelly direct light generated by a lamp bulb 13. Each reflector 14 has an opening 15 through which the lamp bulb 13 penetrates into each compartment. Also, the compartments 11 and 12 are limited by the side walls 16 and by a central partition 17 separating the compartments. The partition 17, however, is shorter in length than the side walls 16.

Opposite the reflectors 14 there is a pink color cover glass 20 spanning across both compartments 11 and 12. The cover glass 20 has a surrounding collar 21 at its peripherial edge by which collar the cover is fastened to the front faces of the side walls 16, for example by means of ultrasonic sealing. On its inner side, the cover glass 20 is provided with a plurality of cylindrical lenses 22 which are horizontally arranged in the installed position of the device.

Immediately underneath the front faces of the side walls 16 substantially parallel to the cover glass 20 is a carrier disc 25, which continuously spans across both compartments 11 and 12. As shown best in FIG. 2, there are a plurality of parallel stripes 26, running vertically in the installed position of the device, on the external side of the carrier disc opposite the cover glass 20, which stripes are located a predetermined distance from each other. The stripes 26 are black and totally opaque. The inner side of the carrier disc 25 is provided with a plurality of cylindrical lenses 27 which are vertically arranged in the installed position of the device. The positions of the lenses 27 are chosen with respect to the position of the stripes in such a way that as much light as possible, as produced by the lamp bulb 13 and directed by the reflector 14, is refracted between the stripes 26.

The light is diffused by means of the lenses 22 on the cover glass 20 and the lenses 27 on the carrier disc 25 in such a way that the emanating signal can be seen from different angles. The lenses 22 on the cover glass 20 and the distance between the cover glass 20 and the carrier disc 25 have the effect, while the light 13 is switched off, that the stripes 26 on the carrier disc 25 can only be seen in a diffuse way and that they reinforce the hue of the cover glass by making it slightly darker.

Two color filters 30 and 31 are installed in the compartment 11 between the carrier disc 25 and the lamp bulb 13, which filters are molded one onto the other. The filter 30 is of an unsaturated blue hue and the filter 31 is of an unsaturated green hue. Both filters are immediately situated underneath the front face of the partition 17, so that the partition as well as the side walls 16 of the compartment 11 are covered by the filters.

A red-colored filter 32 is provided across the compartment 12 and is located in substantially the same plane as the filters 30 and 31 which span compartment 11.

So as to minimize the influence of the color of the signal lamp, the side walls 16 are made dark, preferably black, at least as far as the sections between the filters 30, 31 and 32 respectively and the front faces of the side walls.

When the lamp bulb 13 is switched off, the appearance of the signal lamp is determined in both compartments by the pink-colored cover glass. Due to the different optics on the cover glass 20 and the carrier disc 25, the dark stripes on the carrier disc 25 and their distance from the color filters in the interior of the housing compartment, entry of external light into the compartments 11 and 12 through the internal filters is minimized. The optics also reduce the exit of any light that may have entered the housing from the outside.

When the lamp bulb 13 is illuminated, the light shines through the internal color filters 30, 31 and 32 respectively, through the carrier disc 25 and the cover glass 20. The combination of the unsaturated green hue filter 31, the unsaturated blue hue filter 30 and the unsaturated pink hue cover glass 20 produces a white light at the outside, while the combination of the red hue filter 32 and the unsaturated pink hue cover glass 20 produces a red light. Accordingly, the signal emanating from the compartment 11 is used as a reverse lamp and the signal emanating from the compartment 12 can be used as a taillight, stoplight and fog warning lamp.

If desired, a yellow turn-signal lamp can be provided for by utilizing an orange filter in place of the blue filter 30 in an additional compartment.

For the purpose of directing in parallel the light produced by the lamp bulbs, a Fresnel disc can be installed in front of the lamp bulb in place of the reflectors. This also further restricts the exit of any light which may have entered from the outside.

What is claimed is:

1. A signal lamp for an automotive vehicle, comprising a housing, a light source approximating a white light, a transparent glass cover mounted to said housing and having an unsaturated pink color, a first light filter having an unsaturated color different from that of the cover glass mounted between said light source and said cover glass, and means for reducing the influence of the first filter on the color of the cover glass with said light source off, said means for reducing including a colorless carrier disc mounted between the cover glass and the first filter including a plurality of black, opaque sections and a collecting lens means for directing said light between said opaque sections, said carrier disc being spaced a predetermined distance from the cover glass and said means for reducing being substantially invisible when said lamp is assembled.

2. The signal lamp according to claim 1, wherein the opaque sections include a plurality of stripes.

3. The signal lamp according to claim 2, wherein in an assembled position of the signal lamp in said vehicle the stripes are vertically arranged.

4. The signal lamp according to claim 1 wherein the first filter extends between opposing side walls of the housing.

5. The signal lamp according to claim 4, wherein the walls of the housing between the cover glass and the first filter are darkened.

6. The signal lamp according to claim 1 wherein said housing comprises at least two side by side compartments, each compartment adapted to emanate a different visual signal, the carrier disc continuously spans across said at least two compartments.

7. The signal lamp according to claim 1 further comprising a second light filter which is colored by an unsaturated color different from the cover glass and the first light filter.

8. The signal lamp according to claim 7 wherein the first and the second filter are located immediately one after the other.

9. The signal lamp according to claim 8 wherein the first and second filters are molded immediately together.

10. The signal lamp according to claim 7 wherein the cover glass is pink and one of the first and second filters is blue and the other is green.

11. The signal lamp according to claim 7 wherein the cover glass is pink and one of the first and second filters is orange and the other is green.

* * * * *